(12) United States Patent
Song et al.

(10) Patent No.: US 9,487,048 B2
(45) Date of Patent: Nov. 8, 2016

(54) FILM FOR A TIRE INNER LINER AND PREPARATION METHOD THEREFOR

(71) Applicant: Kolon Industries, Inc., Gwacheon-si (KR)

(72) Inventors: Ki-Sang Song, Seoul (KR); Gi-Woong Kim, Daegu (KR); Sang-Mok Lee, Gumi-si (KR); Ok-Hwa Jeon, Gyeongsan-si (KR); Il Chung, Daegu (KR); Si-Min Kim, Daegu (KR)

(73) Assignee: KOLON INDUSTRIES, INC., Gwacheon-Si (KR)

( * ) Notice: Subject to any disclaimer, the term of this patent is extended or adjusted under 35 U.S.C. 154(b) by 657 days.

(21) Appl. No.: 13/804,256

(22) Filed: Mar. 14, 2013

(65) Prior Publication Data

US 2013/0192736 A1 Aug. 1, 2013

Related U.S. Application Data

(63) Continuation-in-part of application No. PCT/KR2012/005188, filed on Jun. 29, 2012.

(30) Foreign Application Priority Data

Jun. 29, 2011 (KR) .................. 10-2011-0063956
Jun. 30, 2011 (KR) .................. 10-2011-0064870
Jun. 29, 2012 (KR) .................. 10-2012-0070633
Jun. 29, 2012 (KR) .................. 10-2012-0070634

(51) Int. Cl.

| B29D 30/06 | (2006.01) |
|---|---|
| B32B 25/06 | (2006.01) |
| B32B 27/34 | (2006.01) |
| B60C 1/00 | (2006.01) |
| B60C 5/14 | (2006.01) |
| C09J 161/12 | (2006.01) |
| C08L 77/00 | (2006.01) |
| B32B 25/08 | (2006.01) |
| B32B 7/12 | (2006.01) |
| B32B 27/08 | (2006.01) |
| C08G 69/40 | (2006.01) |

(52) U.S. Cl.

CPC ......... *B60C 1/0008* (2013.04); *B29D 30/0681* (2013.01); *C08L 77/00* (2013.01); *C09J 161/12* (2013.01); *B29D 2030/0682* (2013.01); *B32B 7/12* (2013.01); *B32B 25/08* (2013.01); *B32B 27/08* (2013.01); *B60C 5/14* (2013.01); *B60C 2005/145* (2013.04); *C08G 69/40* (2013.01); *C08L 2205/02* (2013.01)

(58) Field of Classification Search
None
See application file for complete search history.

(56) References Cited

U.S. PATENT DOCUMENTS

| 8,336,592 B2 | 12/2012 | Sawada |
| 8,544,517 B2 | 10/2013 | Hong |
| 2008/0047646 A1 | 2/2008 | Hong |

FOREIGN PATENT DOCUMENTS

| CN | 101981120 | 2/2011 | |
|---|---|---|---|
| JP | 52-136259 | 11/1977 | |
| JP | 09-165469 | 6/1997 | |
| JP | 10-036504 | 2/1998 | |
| JP | 11-170339 | 6/1999 | |
| JP | 2002-080644 | 3/2002 | |
| JP | 2003-049068 | 2/2003 | |
| JP | 2005-219565 | 8/2005 | |
| JP | 2007-160833 | 6/2007 | |
| JP | 2008-503396 | 2/2008 | |
| JP | 2008-504173 | 2/2008 | |
| JP | 2009-233998 | 10/2009 | |
| JP | 2009-255489 | 11/2009 | |
| JP | 2009-291962 | 12/2009 | |
| JP | 4435253 | 1/2010 | |
| JP | 2010-095604 | 4/2010 | |
| JP | 2011-056812 | 3/2011 | |
| JP | 2011-063750 | 3/2011 | |
| KR | 1020090047482 | 5/2009 | |
| KR | 1020120002496 A | * 1/2012 | ............... C09J 7/02 |
| WO | 2008-053747 | 5/2008 | |

OTHER PUBLICATIONS

Machine translation of KR 10-2012-0002496, Jan. 2012.*
International Search Report of Application No. PCT/KR2012/005188 (Jan. 31, 2013).

* cited by examiner

*Primary Examiner* — Ramsey Zacharia
(74) *Attorney, Agent, or Firm* — Lex IP Meister, PLLC (57) ABSTRACT

The present invention relates to a film for a tire inner liner including: a base film layer including polyamide-based resin and a copolymer including a polyamide-based segment and a polyether-based segment; and an adhesive layer including a resorcinol-formalin-latex (RFL)-based adhesive, wherein there is little difference between properties in an MD (machine direction) and a TD (transverse direction), and a method for preparing a film for a tire inner liner, including melting the polyamide-based resin and the copolymer at 230 to 300° C., extruding the molten substance under specific die gap conditions to form a base film, and forming an adhesive layer including a resorcinol-formalin-latex (RFL)-based adhesive on the base film.

15 Claims, 2 Drawing Sheets

- PRIOR ART -

FILM FOR A TIRE INNER LINER AND PREPARATION METHOD THEREFOR

CROSS-REFERENCES TO RELATED APPLICATION

This application is a continuation-in-part application of PCT/KR2012/005188 filed on Jun. 29, 2012, which claims priority to Korean Patent Application No. 10-2011-0063956 filed on Jun. 29, 2011; Korean Patent Application No. 10-2011-0064870 filed on Jun. 30, 2011; Korean Patent Application No. 10-2012-0070633 filed on Jun. 29, 2012; and Korean Patent Application No. 10-2012-0070634 filed on Jun. 29, 2012, the contents of which are incorporated herein by reference.

FIELD OF THE INVENTION

A film for a tire inner liner and a method of preparing thereof are provided. In certain embodiments, a film for a tire inner liner may exhibit an excellent gas barrier property with a thin thickness, thus enabling light weight of a tire and improvement in automobile mileage, and has uniform properties in all directions of the film, thus having excellent formability and improved durability.

BACKGROUND OF THE INVENTION

Figure 1:
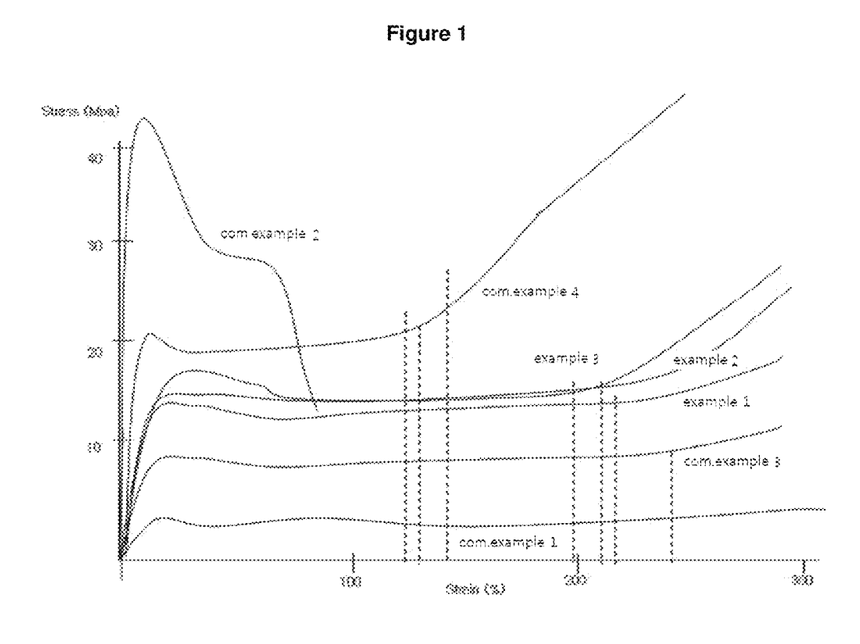
FIG. 1 shows a machine direction Sstress-Sstrain graph of the films according to Examples and Comparative Examples, FIG. 2 schematically shows the structure of a pneumatic tire.
Figure 2:
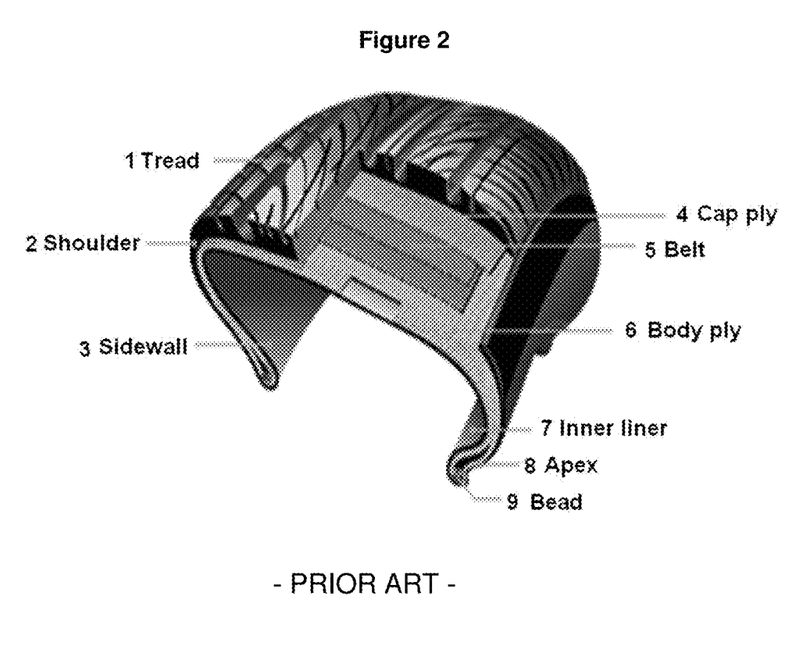

A tire is designed to withstand the weight of an automobile, reduce impact force exerted by the road, and transfer driving force or braking force of an automobile to the ground. In general, a tire is a complex of fiber/steel/rubber, and has a structure as shown in FIG. 1.

Tread (1) is a part contacting the road. It should afford frictional forces required for driving/braking, have superior wear and heat resistance, and withstand external impact force.

Body ply, or carcass (6) is a cord layer inside the tire. It should be able to support the weight of an automobile, withstand impact force, and have high resistance to fatigue caused by bending and stretching during automobile operation.

Belt (5), mainly made up of a steel wire, is located between the body plies, adapted to reduce external impact force and maintains a wide contact area of the tread for vehicle running stability.

Side wall (3) is a rubber layer between a part below a shoulder (2) and bead (9). It protects the body ply (6).

Inner liner (7), in replacement of a tube, is located inside the tire, and allows a pneumatic tire by preventing air leakage.

Bead (9), a square or hexagonal wire bundle formed of rubber-coated steel wires, serves to position and fix the tire in a rim.

Cap ply (4) is a special cord located on a radial tire belt, and minimizes the belt movement during operation of an automobile.

Apex (8) is a triangular rubber filler designed to minimize the bead displacements, protect the beads by alleviating external impact force, and prevent air inflow during the tire construction.

Recently, a tubeless tire injected with a high air pressure of 30 to 40 psi has been commonly used. In such tire, an inner liner having high gas barrier properties is positioned on the inner layer of the carcass to prevent air leakage during automobile operation.

Moreover, as a main ingredient, a tire inner liner including a rubber such as butyl rubber or halobutyl rubber and the like having relatively low air permeability has been previously used. In order to achieve sufficient gas barrier properties for such inner liner, however, an increase in the amount of the rubber content or in the thickness of the inner liner thickness has been required. As a result, the total weight of the tire was increased, thereby decreasing fuel efficiency. In addition, during tire vulcanization or vehicle operation, air pockets were generated between the inner rubber of the carcass layer and the inner liner, or the deformation or deviation of the shapes or properties of the Various methods have been suggested to minimize the thickness and weight of the inner liner to increase fuel efficiency, and maintain the shape or properties of the inner liner during tire vulcanization or vehicle operation.

These methods, however, have limitations in providing excellent air permeability and formability of a tire while sufficiently decreasing the thickness and weight of the inner liner. Further, the use of an additional tie gum rubber for a strong bonding to a carcass layer inside the tire increases the weight of a tire and degrades fuel efficiency. The inner liner manufactured according to the methods has not shown sufficient fatigue resistance, generating cracks, for instance, from repeated deformations during the preparing process or operation.

Furthermore, it was difficult for the previous inner liner film to be applied in various deformation or elongation processes due to a significant difference between properties in a machine-discharged direction and other directions, and it is non-uniformly deformed according to a film direction during a tire preparing process or automobile running, and thus mechanical properties or durability of the inner liner are lowered.

SUMMARY OF THE INVENTION

Disclosed herein is a film for a tire inner liner and a method for preparing the film for a tire inner liner. The film for a tire inner liner may exhibit an excellent gas barrier property with a thin thickness, thus enabling light weight of a tire and improvement in automobile mileage, and has uniform properties in all directions of the film, thus having excellent formability and improved durability.

An exemplary embodiment provides a film for a tire inner liner including: a base film layer including polyamide-based resin and a copolymer including a polyamide-based segment and a polyether-based segment; and an adhesive layer formed on at least one side of the base film layer and including a resorcinol-formalin-latex (RFL)-based adhesive, wherein the content of the polyether-based segment of the copolymer is 15 to 50 wt % based on the total weight of the base film layer, and a ratio of the tensile modulus in the second direction to the tensile modulus in the first direction at initial 2% elongation of the base film layer is 0.9 to 1.1, the second direction being perpendicular to the first direction.

An exemplary embodiment provides a method for preparing a film for a tire inner liner, including: melting a mixture of polyamide-based resin and a copolymer including a polyamide-based segment and a polyether-based segment at 230 to 300° C.; extruding the molten substance under a die gap condition of 0.3 to 1.5 mm to form a base film layer; and forming an adhesive layer including a resorcinol-formalin-latex (RFL)-based adhesive on at least one side of the base film layer, wherein the content of the polyether-based segment of the copolymer is 15 to 50 wt % based on the total weight of the base film layer, and the ratio of the tensile modulus in the MD (machine direction) to tensile modulus in the TD (transverse direction) at the initial 2% elongation of the base film layer is 0.9 to 1.1.

Hereinafter, further embodiments will be described in detail.

BRIEF DESCRIPTION OF THE DRAWINGS

The exemplary embodiments will be more clearly understood from the following detailed description taken in conjunction with the accompanying drawings, where.

DETAILED DESCRIPTION OF THE INVENTION

The present invention will be described more fully hereinafter in the following detailed description of the invention, in which some but not all embodiments of the invention are described. This invention may be embodied in many different forms and should not be construed as limited to the embodiments set forth herein; rather, these embodiments are provided so that this disclosure will satisfy applicable legal requirements.

According to one embodiment of the invention, there is provided a film for a tire inner liner including: a base film layer including polyamide-based resin and a copolymer including a polyamide-based segment and a polyether-based segment; and an adhesive layer formed on at least one side of the base film layer and including resorcinol-formalin-latex (RFL)-based adhesive, wherein the content of the polyether-based segment of the copolymer is about 15 to about 50 wt % based on total weight of the base film layer, and the ratio of the tensile modulus in the second direction to the tensile modulus in the first direction at the initial about 2% elongation of the base film layer is about 0.9 to about 1.1, the second direction being perpendicular to the first direction.

As results of studies, the inventors confirmed that if a base film layer formed using the above-explained copolymer and polyamide-based resin is used, an excellent gas barrier property may be achieved with a thin thickness, thus enabling light weight of a tire and improvement in automobile mileage, and thus a film for a tire inner liner that has excellent mechanical properties including high durability and fatigue resistance and excellent formability while having high heat resistance may be provided.

Particularly, the film for a tire inner liner has excellent formability enabling application for various deformation or elongation processes in all directions of the film, and prevents non-uniform deformation according to the direction of a film during automobile running, thus exhibiting excellent mechanical properties and improved durability.

Specifically, as described in the following preparing method, by mixing the polyamide-based resin and the above copolymer in a specific ratio and melting, and extruding the molten substance under a specific die gap condition, a base film having uniform properties in all directions of the film may be provided. Moreover, by attaching and folding the extruded molten substance under a specific die gap condition to a cooling roll installed at a horizontal distance of 10 to 150 mm from the die outlet, a base film that does not exhibit orientation due to stretching may be obtained.

Thereby, the ratio of tensile modulus in the second direction to tensile modulus in the first direction at the initial about 2% elongation of the base film layer is about 0.9 to about 1.1, preferably about 0.92 to about 1.08, the second direction being perpendicular to the first direction. The tensile modulus means elastic modulus showing the ratio of stress and strain, and specifically, means the gradient value of a stress-strain graph (S-S curve) measured at the initial about 2% elongation under a room temperature condition.

Meanwhile, the ratio of yield strength in the second direction to yield strength in the first direction of the base film may be about 0.9 to about 1.1, preferably about 0.92 to about 1.08, the second direction being perpendicular to the first direction. The yield strength means critical stress that generates elastic deformation, and specifically, means the maximum value of stress in a about 0 to about 50% elongation section.

Since a difference between yield strength in one direction and yield strength in another direction perpendicular to the one direction of the base film is not large, uniform elongation and deformation toward both directions is enabled during a tire forming process, thus preventing tire forming faults and preventing damage to a tire caused by stress concentrated on one direction during automobile running.

Further, flat elongation in the first direction and flat elongation in the second direction of the base film layer are respectively about 150% or more, preferably about 200% to about 400%, the second direction being perpendicular to the first direction. The ratio of flat elongation in the second direction to flat elongation in the first direction is about 0.9 to about 1.1, preferably about 0.92 to about 1.08.

The flat elongation means elongation at a time when stress rapidly increases by orientation due to an increase in yield strength/tensile strain, and specifically, it may be elongation percentage at a point where stress becomes identical to a yield stress point in an elongation section after the yield point (or elongation percentage at a point where a gradient change of the S-S curve is the largest, in the elongation section after the yield point).

Since flat elongation in the first direction and flat elongation in the second direction which is perpendicular to the first direction are respectively 150% or more and the difference therebetween is not large, if the film for a tire inner liner is applied, uniform elongation and deformation toward both directions is enabled during a tire forming process, thus preventing a tire forming fault and preventing tire damage caused by stress concentrated in one direction during automobile running.

Meanwhile, the first direction may be the TD (transverse direction) of the base film, and the second direction which is perpendicular to the first direction may be the MD (machine direction) of the base film.

The MD (machine direction) may be a direction where a base film is formed during the preparing process of the film for a tire inner liner, and it means a direction surrounding the circumferential direction of a tire or a forming drum, during practical tire manufacture. The TD (transverse direction) means a direction perpendicular to the MD, and it may be a direction horizontal to the axis direction of a tire or tire forming drum.

Meanwhile, the base film may exhibit high reactivity to the above-explained adhesive layer due to the characteristic chemical structure, and the adhesive layer may also exhibit high and uniform adhesion to a tire carcass layer. Thus, the film for an inner liner may be strongly bonded to a tire without applying a vulcanization process or largely increasing the thickness of the adhesive layer, and sever lowering of adhesion between the inner liner film and a tire carcass layer or a break between the base film and the adhesive layer may be prevented in a tire preparing process during which high temperature deformation or elongation is applied or in automobile running during which repeated physical deformations are applied for a long time.

Since the film for a tire inner liner does not considerably require additional additives or rubber ingredients for property improvement, the preparing process may be simplified and the tire preparing cost may be reduced. Thus, the film for a tire inner liner may enable light weight of a tire to improve automobile mileage, maintains optimum air pressure even after use for a long period thus preventing overturning accidents and mileage degradation caused by low air pressure, has excellent ability to withstand repeated fatigue during running to secure durability, and may manufacture a tire having excellent performance with a simple preparing process.

The above-explained properties of the film for a tire inner liner result from the application of the base film layer having absolute weight average molecular weight, manufactured using a copolymer including specific contents of a polyether-based segment and a polyamide-based segment together with the polyamide-based resin.

More specifically, since the base film layer uses a specific copolymer including specific contents of the polyether-based segment that afford an elastomeric property to a polyamide-based resin, together with the polyamide-based resin, it may simultaneously have an excellent gas barrier property and a relatively low modulus. The polyamide-based resin included in the base film layer, due to the molecular chain property, exhibits an excellent gas barrier property, for example, 10 to 20 times higher compared to butyl rubber and the like that are commonly used in a tire with the same thickness, and it exhibits a low modulus compared to other resins. The polyether-based segment in the copolymer are bonded or dispersed between the polyamide-based segment or polyamide-based resins, thus further lowering the modulus of the base film layer, preventing an increase in stiffness of the base film layer, and preventing crystallization at a high temperature.

Since the polyamide-based resin generally exhibits an excellent gas barrier property, it allows the base film layer to have low air permeability while having a thin thickness. Also, since the polyamide-based resin exhibits a relatively low modulus compared to other resins, even if applied together with a copolymer including specific contents of the polyether-based segment, an inner liner film exhibiting a relatively low modulus property may be obtained, thus improving tire formability. Further, since the polyamide-based resin has sufficient heat resistance and chemical stability, it may prevent deformation or degeneration of the inner liner film when exposed to chemical substances such as additives and the like or a high temperature condition applied during a tire preparing process.

Furthermore, the polyamide-based resin may be used together with a copolymer including a polyamide-based segment and a polyether-based segment to increase its reactivity to an adhesive, such as, a resorcinol-formalin-latex (RFL)-based adhesive. The inner liner film may easily adhere to a carcass part, and an interface break caused by heat or repeated deformations during a tire manufacturing process, or vehicle operation may be avoided to afford sufficient fatigue resistance to the inner liner film.

The polyamide-based resin may have a relative viscosity (sulfuric acid, 96% solution) of about 3.0 to about 3.5, preferably about 3.2 to about 3.4. If the viscosity of the polyamide-based resin is less than 3.0, sufficient elongation may not be secured due to a reduction in toughness, generating damages during a tire manufacturing process or automobile operation, and the base film layer may not have properties including gas barrier properties, formability, or the like required for a tire inner liner film. If the viscosity of the polyamide-based resin is greater than 3.5, the modulus or viscosity of the manufactured base film layer may become unnecessarily high, and the tire inner liner may not have appropriate formability or elasticity.

The relative viscosity of the polyamide-based resin is measured using a sulfuric acid 96% solution at room temperature. Specifically, specimens of the polyamide-based resin (for example, a 0.025 g specimen) are dissolved in a sulfuric acid 96% solution at various concentrations to prepare two or more solutions for measurement (for example, polyamide-based resin specimens are dissolved in a sulfuric acid 96% solution at concentrations of 0.25 g/dL, 0.10 g/dL, and 0.05 g/dL to prepare 3 solutions for measurement), and then the relative viscosities of the solutions for measurement may be calculated using a viscosity tube at 25° C. (for example, a ratio of the average viscosity tube-passing time of the measurement solution to the passing time of the sulfuric acid 96% solution).

The polyamide-based resin in the base film layer may include a polyamide-based resin, for example, nylon 6, nylon 66, nylon 46, nylon 11, nylon 12, nylon 610, nylon 612, a copolymer of nylon 6/66, a copolymer of nylon 6/66/610, nylon MXD6, nylon 6T, a copolymer of nylon 6/6T, a copolymer of nylon 66/PP, and a copolymer of nylon 66/PPS; or N-alkoxy alkylate thereof, for example, a methoxy methylate of 6-nylon, a methoxy methylate of 6-610-nylon or a methoxy methylate of 612-nylon. In one embodiment, nylon 6, nylon 66, nylon 46, nylon 11, nylon 12, nylon 610, or nylon 612 may be preferable.

The polyamide-based resin may be used itself, or it may be included in the base film layer by preparing a base film using monomers of the polyamide-based resin or precursor of the polyamide-based resin.

In the manufacturing process of the base film, the polyamide-based resin may be mixed with the above-explained copolymer following by melting to be included in the base film, or precursors of the polyamide-based resin such as monomers or oligomers and the like may be mixed with the above-explained copolymer together with initiators or a catalyst and the like to be included in the base film layer.

Since the copolymer including a polyamide-based segment and a polyether-based segment may bond to, or be dispersed inbetween the polyamide-based resin, it may further decrease the modulus of the base film, and prevent stiffening of the base film layer and crystallization at a high temperature. The inclusion of the copolymer in the base film layer results in a film for a tire inner liner having high elasticity or an elasticity recovery rate while securing excellent mechanical properties including durability, heat resistance, fatigue resistance, and the like. Hence, the inner liner film may exhibit excellent formability. Moreover, the physical properties or performance of a tire using the same may be minimally deteriorated from repeated deformations and high heat generated during automobile operation.

Meanwhile, if the content of the polyether-based segment of the copolymer is about 15 to about 50 wt %, preferably about 20 to about 45 wt %, and more preferably about 22 to about 40 wt %, based on the total weight of the base film layer, the film for a tire inner liner may exhibit excellent properties and performance. If the content of the polyether-based segment of the copolymer is less than 15 wt % based on the total weight of the base film layer, the modulus of the base film layer or tire inner liner film may increase to lower tire formability, or property deterioration due to repeated deformations may largely occur. If the content of the polyether-based segment of the copolymer is greater than 50 wt % based on the total weight of the base film layer, the gas barrier properties required for a tire inner liner may not become inferior, thus lowering tire performance. In addition, the inner liner may not easily adhere to a carcass layer due to lowered reactivity to an adhesive, and a uniform film may not be easily manufactured due to increased elasticity of the base film layer.

The polyether-based segment may be bonded to the polyamide-based segment or dispersed between the polyamide-based resins, and may prevent growth of large crystals in the base film layer during a tire manufacturing process or automobile operation, or prevent easy breakage of the base film layer.

The polyether-based segment may further lower the modulus of the tire inner liner film to increase the tire formability. For example, such modulus allows relatively easy elongation or deformation according to the shape of a tire without the needs for the application of excessive force. The polyether-based segment may prevent film stiffening at a low temperature and crystallization at a high temperature. Damages including tears to the inner liner film caused by constant deformations and the like may be further avoid, and the deformation recovery of the inner liner may be also improved to prevent wrinkle formations on the film due to permanent deformation. Overall, the polyether-based segment may improve durability of a tire or inner liner.

The polyamide-based segment may prevent a large increase in the modulus property while maintaining adequate mechanical properties of the copolymer. The base film layer including the segment may have low air permeability while having a thin thickness, sufficient heat resistance, and chemical stability.

The copolymer including a polyamide-based segment and a polyether-based segment may be obtained by reacting one or more polyamide-based monomers or oligomers and one or more polyether-based monomers or oligomers, or it may be obtained by a polymerization reaction or cross-linking reaction of a polymer including a polyamide-based segment and a polymer including a polyether-based segment.

The copolymer including a polyamide-based segment and a polyether-based segment may be a block copolymer wherein the segments are bonded while forming a block, or it may be a random copolymer wherein the segments are irregularly bonded. The copolymer including a polyamide-based segment and a polyether-based segment may be a copolymer including a product of polymerization of a polymer including a polyamide-based segment and a polymer including a polyether-based segment, or it may be a cross-linked copolymer including a product of a cross-linking reaction between a polymer including a polyamide-based segment and a polymer including a polyether-based segment.

Meanwhile, in the base film layer, the polyamide-based resin and the copolymer including a polyamide-based segment and a polyether-based segment may be uniformly mixed, or may be partly or wholly bonded through polymerization or cross-linking.

In case the copolymer including a polyamide-based segment and a polyether-based segment includes a product of polymerization or a cross-linking reaction between a polymer including a polyamide-based segment and a polymer including a polyether-based segment, the copolymer may include a polymer including a polyamide-based segment or a polymer including a polyether-based segment which do not participate in the polymerization or cross-linking reaction. Accordingly, in the base film, a polymer including a polyamide-based segment or a polymer including a polyether-based segment as well as the polymerization product or cross-linking reaction product may be mixed or bonded with other ingredients. In such case, the sum of the content of the polyether-based segment of the copolymer and the content of the polymer including the polyether-based segment may be about 15 to about 50 wt % based on the total weight of the base film layer, so as to optimize the required properties of the inner liner film.

The polyamide-based segment of the copolymer may include a repeating unit of the following Chemical Formula 1 or Chemical Formula 2.

[Chemical Formula 1]

In Chemical Formula 1, $R_1$ is a C1-20 linear or branched alkylene group or a C7-20 linear or branched arylalkylene group.

[Chemical Formula 2]

In Chemical Formula 2, $R_2$ is a C1-20 linear or branched alkylene group, and $R_3$ is a C1-20 linear or branched alkylene group or a C7-20 linear or branched arylalkylene group.

In case a base film layer is manufactured using a copolymer including a polyamide-based repeating unit and a polyether-based repeating unit, the polyamide-based segment may be the polyamide-based repeating unit. The polyamide-based segment may be derived from a polymer including a polyamide-based segment used in the manufacturing process of the base film, or one or more polyamide-based monomers or oligomers.

The polyether-based segment of the copolymer may include a repeating unit of the following Chemical Formula 3.

[Chemical Formula 3]

In Chemical Formula 3, $R_5$ is a C1-10 linear or branched alkylene group, n is an integer of from 1 to 100, and $R_6$ and $R_7$ may be identical or different, and are independently a direct bond, —O—, —NH—, —COO—, or —CONH—.

In case a base film layer is manufactured using a copolymer including a polyamide-based repeating unit and a polyether-based repeating unit, the polyether-based segment may be the polyether-based repeating unit. The polyether-based segment may be derived from a polymer including a polyether-based segment used in the manufacturing process of the base film, or polyether-based monomers or oligomers.

The copolymer including the polyamide-based segment and the polyether-based segment may have an absolute weight average molecular weight of about 50,000 to about 300,000, preferably about 70,000 to about 200,000. If the absolute weight average molecular weight of the copolymer is less than 50,000, the manufactured base film layer may not have sufficient mechanical properties required for use in an inner liner film, and the film for a tire inner liner may not have a sufficient gas barrier property. If the absolute weight average molecular weight of the copolymer is greater than 300,000, the modulus or crystallinity of the base film layer may excessively increase during high temperature heating, and the elasticity or elasticity recovery rate required for an inner liner film may not be secured.

Meanwhile, the copolymer may include the polyamide-based segment and the polyether-based segment in the weight ratio of about 6:4 to about 3:7, preferably about 5:5 to about 4:6, while the content of the polyether-based segment is about 15 to about 50 wt % based on the total weight of the film.

As explained, if the content of the polyether-based segment is too low, the modulus of the base film layer or tire inner liner film may increase to lower formability of the tire, or properties may be largely degraded due to repeated deformations. On the other hand, if the content of the polyether-based segment is too high, the gas barrier properties of the film for a tire inner liner may be lowered, the inner liner may not easily adhere to a carcass layer due to lowered reactivity to adhesive, and a uniform film may not be easily manufactured due to increased elasticity of the base film layer.

In the base film layer, the polyamide-based resin and the above explained copolymer may be included in the weight ratio of about 6:4 to about 3:7, and preferably about 5:5 to about 4:6. If the content of the polyamide-based resin is too low, the density or gas barrier properties of the base film layer may be lowered. If the content of the polyamide-based resin is too high, the modulus of the base film layer may become excessively high or formability of the tire may be lowered, the polyamide-based resin may be crystallized under a high temperature environment during a tire manufacturing process or automobile operation, and cracks may be generated due to Meanwhile, the base film layer may be an unstretched film. If the base film layer is an unstretched film, it may have a low modulus and high strain, and thus it may be appropriately applied in a tire forming process during which high expansion is generated. Since crystallization hardly occurs in the unstretched film, damages such as cracks and the like may be prevented even if deformations repeatedly occur. Since the unstretched film does notis unlikely to have much difference in terms of its properties depending on thea large property difference and orientation in a specific direction, an inner liner having uniform properties may be obtained. As described in the following manufacturing method of a film for a tire inner liner, the base film may be manufactured in the form of an unstretched or non-oriented film by maximally preventing the orientation formation inof the base film layer, for example, by a viscosity control through optimization of melt-extrusion temperature, a modification of die standard, a control of the installation location of a cooling roller, a control of the installation location of an air knife, a control of the installation location of a pinning device (electrostatic charging device), a control of winding speed, and the like. As described in the following manufacturing method of a film for a tire inner liner, the base film may be manufactured in the form of an unstretched or non-oriented film by maximally preventing the orientation of the base film layer, for example, by viscosity control through optimization of melt-extrusion temperature, modification of die standard, control of winding speed, or the like.

If an unstretched film is applied for the base film layer, a film for an inner liner may be easily manufacture prepared in a cylindrical- or sheet-type in a tire manufacturing process. Particularly According to one embodiment, in case an unstretched sheet-type film is applied for the base film layer, no separate film manufacturing facilities depending on the size of the tire is needed not to be separately constructed according to tire size, and more importantly, physical impacts and wrinkles may be minimized during transfer and storage. In another embodiment, in case the base film is manufactured in a sheet type, a process of adding an adhesive layer may be more easily conducted, and damages, deformations, or the like generated during a manufacturing process due to a difference in standards difference from or a tire forming drum may be prevented.

The base film layer may have a thickness of 30 to 300 μm, preferably 40 to 250 μm, and more preferably about 40 to about 200 μm. Thus, the film for a tire inner liner according to one embodiment of the invention may have low air permeability, for example oxygen permeability of about 200 $cc/(m^2 \cdot 24\ h \cdot atm)$ or less, while having a thin thickness, compared to those previously known.

The base film may further include additives such as a heat resistant oxidant, a heat stabilizer, an adhesion improving agent, or a mixture thereof. Specific examples of the heat resistant oxidant may include N,N'-hexamethylene-bis-(3,5-di-tert-butyl-4-hydroxy-hydrocinnamamide), for example, a commercialized product such as Irganox 1098, tetrakis [methylene(3,5-di-t-butyl-4-hydroxyhydrocinnamate)] methane, for example, a commercialized product such as Irganox 1010), or 4,4'-di-cumyl-di-phenyl-amine, for example, Naugard 445, and the like. Specific examples of the heat stabilizer may include benzoic acid, triacetonediamine, N,N'-bis-(2,2,6,6-tetramethyl-4-piperidyl)-1,3-benzenedicarboxamide, or the like. However, the additives are not limited thereto, and those known to be usable for a tire inner liner film may be used without specific limitations.

Meanwhile, the adhesive layer including a resorcinol-formalin-latex (RFL)-based adhesive has excellent adhesion and adhesion maintenance to the base film layer and a tire carcass layer, and thus, a break of the interface between the inner liner film and the carcass layer, which is generated due to heat generated during a tire preparing process or running, or repeated deformations, may be prevented to afford sufficient fatigue resistance to the inner liner film.

The above-explained properties of the adhesive layer result from inclusion of a specific resorcinol-formalin-latex (RFL)-based adhesive having a specific composition. A rubber-type tie gum, an adhesive for a tire inner liner, required an additional vulcanization process. To the contrary, since the adhesive layer includes a resorcinol-formalin-latex (RFL)-based adhesive having a specific composition, it has high reactivity and adhesion to the base film, and the base film and a tire carcass layer may be stably bonded by pressing under a high temperature heating condition without largely increasing the thickness. Thereby, lightening of the tire weight and improvement in fuel efficiency may be achieved, and a separation between the base film or inner liner layer and a carcass layer may be prevented even if deformations repeatedly occur during a tire manufacturing process or automobile operation. Since the adhesive layer may exhibit high fatigue resistance to physical/chemical deformations, deterioration of adhesion or the like may be minimized in a high temperature manufacturing process or automobile operation process during which mechanical deformations occur for a long period of time.

Furthermore, the resorcinol-formalin-latex (RFL)-based adhesive allows a cross-linking between latex and rubber to provide superior adhesion performance, while having a low curing degree because it is physically a latex polymerization product and thus is flexible like rubber. The chemical bonding between the methylol end group of a resorcinol-formalin polymerization product and the base film is also possible Thus, if the resorcinol-formalin-latex (RFL)-based adhesive is applied to the base film, sufficient adhesion may be achieved.

The resorcinol-formalin-latex (RFL)-based adhesive may include about 2 to about 32 wt %, preferably about 10 to about 20 wt %, of a condensate of resorcinol and formaldehyde, and about 68 to about 98 wt %, preferably about 80 to about 90 wt %, of latex.

The condensate of resorcinol and formaldehyde may be obtained by mixing resorcinol and formaldehyde in the mole ratio of about 1:0.3 to about 1:3.0, preferably about 1:0.5 to about 1:2.5, followed by conducting condensation. The condensate of resorcinol and formaldehyde may be included in the content of about 2 wt % or more based on the total weight of the adhesive layer for excellent adhesion, and it may be included in the content of about 32 wt % or less to secure optimum fatigue resistance.

The latex may be selected from the group consisting of natural rubber latex, styrene/butadiene rubber latex, acrylonitrile/butadiene rubber latex, chloroprene rubber latex, styrene/butadiene/vinylpyridine rubber latex, and a mixture thereof. The latex may be included in the content of 68 wt % or more based on the total weight of the adhesive layer for flexibility and effective cross-linking reaction with rubber, and it may be included in the content of 98 wt % or less for a chemical reaction with the base film and stiffness of the adhesive layer.

The adhesive layer may further include at least one additive such as a surface tension control agent, an anti-foaming agent, a filler, and the like. Although the surface tension control agent is applied for uniform coating of the adhesive layer, it may cause a decrease in adhesion when introduced in an excessive amount, and thus it may be included in the content of 2 wt % or less, or 0.0001 to 2 wt %, preferably 1.0 wt % or less, or 0.0001 to 0.5 wt %, based on the total weight of the adhesive layer. The surface tension control agent may be selected from the group consisting of a sulfonic acid salt anionic surfactant, a sulfate ester surfactant, a carboxylic acid salt anionic surfactant, a phosphate ester anionic surfactant, a fluorine-containing surfactant, a silicone-based surfactant, a polysiloxane-based surfactant, and a combination thereof.

The adhesive layer may have a thickness of about 0.1 to about 20 µm, preferably about 0.1 to about 10 µm, more preferably about 0.2 to about 7 µm, still more preferably about 0.3 to about 5 µm, and it may be formed on one side or both sides of the film for a tire inner liner. If the thickness of the adhesive layer is too thin, the adhesive layer itself may become thinner during tire expansion, cross-linking adhesion between a carcass layer and the base film may be lowered, and stress may be concentrated on a part of the adhesive layer to lower the fatigue resistance property. If the thickness of the adhesive layer is too thick, a separation at the interface may occur to lower the fatigue resistance property. To adhere the inner liner film to a carcass layer of a tire, the adhesive layer is generally formed on one side of the base film, but in case a multi-layered inner liner film is applied, or an adhesion to rubber on both sides is required according to a tire forming method and construction design, for example when an inner liner film covers a bead part, the adhesive layer may be formed on both sides of the base film.

Meanwhile, the adhesive layer may exhibit an excellent modulus property and high elasticity recovery and the like by including the specific resorcinol-formalin-latex (RFL)-based adhesive. Thus, even if the adhesive layer is formed on the base layer, the elongation or deformation property of the base film may not be substantially influenced. That is, the film for a tire inner liner including a base film layer and an adhesive layer may have the above-explained elongation property of the base film, and for example, the ratio of tensile modulus in the second direction to tensile modulus in the first direction at the initial 2% elongation of the tire inner liner film layer may be 0.9 to 1.1, and preferably 0.92 to 1.08, the second direction being perpendicular to the first direction, and the ratio of yield strength in the second direction to yield strength in the first direction of the tire inner liner film may be 0.9 to 1.1, and preferably 0.92 to 1.08.

Further, flat elongation in the first direction and flat elongation in the second direction of the tire inner liner film layer may be respectively about 150% or more, and preferably about 200% to about 400%, the second direction being perpendicular to the first direction, and the ratio of flat elongation in the second direction to flat elongation in the first direction may be 0.9 to 1.1, 0.92 to 1.08.

Meanwhile, the film for a tire inner liner may be formed on the adhesive layer, and further include a release film layer including a polymer film having initial modulus of 1500 Mpa at room temperature.

The initial modulus of the release film may be 1500 Mpa or more, preferably 2000 Mpa or more, or 1500 Mpa to 5000 Mpa. When the release film has the above-explained modulus property, cracks and the like that may be generated by external impact or pressure repeated for a long time may be minimized, an increase in the modulus that is caused by elongation due to externally applied tension during winding of the tire inner liner film or tire manufacture may be prevented, and operability of the tire inner liner film may be increased to allow easy application in a process. The initial modulus refers to the modulus of a release film in a non-elongated state.

Particularly, in order to install the tire inner liner film so as to enter inside the tire bead part or to exhibit adhesion of the lapped part of the inner liner film, the adhesive layer may be formed on both sides of the base film, wherein the release film layer may prevent fusion of the adhesive layers formed on both sides of the base film.

The polymer film included in the release film layer may include a polyolefin-based resin, a polyester resin, or a mixture or a copolymer thereof. The polyolefin resin may include a polyethylene resin, a polypropylene resin, and the like, and the polyester resin may include a polyethylene terephthalate resin and the like.

As the release film layer includes the above-explained polymer resin, the release film layer may have appropriate adhesion to the adhesion layer such that it may be strongly bonded during a product storage process and the like, and may be easily separated without influencing the adhesive layer or the base film in a practical process application, and product damage due to external impact or pressure repeated for a long time or blocking (adhering of film interlayer) may be prevented.

Further, the release film layer may have a thickness of about 5 to about 50 um, and preferably about 8 to about 35 um. If the release film layer is too thin, repeated pressure or external impact may not be prevented, operation may be stopped due to cutting or destruction when it is separated for tire manufacture, it may be easily blown by the air, and it may be attached to other objects due to low modulus. If the release film layer is too thick, preparing cost is excessively increased, and it may not be easily removed during a preparing process due to a high modulus.

Meanwhile, according to another embodiment of the invention, there is provided a method for preparing a film for a tire inner liner, including: melting a mixture of a polyamide-based resin and a copolymer including a polyamide-based segment and a polyether-based segment at about 230 to about 300° C.; extruding the molten substance under a die gap condition of about 0.3 to about 1.5 mm to form a base film layer; and forming an adhesive layer including a resorcinol-formalin-latex (RFL)-based adhesive on at least one side of the base film layer, wherein the content of the polyether-based segment of the copolymer is about 15 to about 50 wt % based on the total weight of the base film layer, and the ratio of tensile modulus in the MD (machine direction) to tensile modulus in the TD (transverse direction) at the initial about 2% elongation of the base film layer is about 0.9 to about 1.1.

The tire inner liner film obtained by the above preparing method may exhibit an excellent gas barrier property and high internal pressure retention performance with a thin thickness, have uniform properties in all directions of the film, particularly in machine and transverse directions, and thus may have excellent formability enabling easy application in various deformation or elongation processes, prevent non-uniform deformation along the film direction during a tire preparing process or automobile running, and may be uniformly and strongly bonded inside the tire with a thin and light weighted adhesive layer because the base film exhibits high reactivity to a specific adhesive.

As the product obtained by melting a mixture of a copolymer including a polyamide-based segment and a polyether-based segment and a polyamide-based resin at about 230 to about 300° C. is extruded under a die gap condition of about 0.3 to about 1.5 mm, preferably about 0.5 to about 1.2 mm, to manufacture a base film, properties in all directions of the base film, for example, in a machine direction and in a transverse direction, may become uniform. Thus, the tire inner liner film has excellent formability enabling easy application in various deformation or elongation processes, and prevents non-uniform deformation along the film direction during a tire preparing process or automobile running, to achieve excellent mechanical properties and improved durability.

In the step of forming the base film, if the die gap is too small, die shear pressure of a melt extrusion process becomes too high, shear stress increases, and thus it may be difficult to form a uniform shape of the extruded film, and productivity may be lowered. If the die gap is too large, stretching of the melt extruded film may largely occur to generate orientation, and a property difference between the machine direction and the transverse direction of the manufactured base film may increase.

The melting temperature may be about 230 to about 300° C., and preferably about 240 to about 280° C. The melting temperature should be higher than the melting point of the polyamide-based compound, but if it is too high, carbonization or decomposition may occur to lower properties of a film, and bonding between the polyether-based resins may occur or orientation may be generated toward a fiber arrangement direction, which is unfavorable for preparing of an unstretched film.

As the extrusion die, those known to be usable for extruding a polymer resin may be used without specific limitations, but a T-type die may be preferably used so that the thickness of the base film may become more uniform or orientation may not be generated in the base film.

Meanwhile, by attaching and folding the molten substance extruded under the specific die gap condition to a cooling part installed at a horizontal distance of 10 to 150 mm from the die outlet, a base film that does not substantially exhibit orientation due to stretching may be obtained.

If the product obtained by melting and extrusion is stretched before cooling and solidification, orientation may be generated in the manufactured base film. Thus, it is required to maximally attach molten resin to the cooling roll in a film shape and solidify it so as to minimize stretching and orientation. Specifically, as explained above, stretching and orientation may be eliminated by attaching or folding the molten substance extruded under the specific die gap condition to a cooling part installed at a horizontal distance of about 10 to about 150 mm, preferably about 20 to about 120 mm, from the die outlet. The horizontal distance from the die outlet to the cooling part may be a distance between the die outlet and a point where discharged molten substance is folded to the cooling part. If the linear distance between the die outlet and the cooling part attaching point of the molten film is too small, uniform flow of melted extruded resin may be disturbed to cause non-uniform film cooling, and if the distance is too large, inhibition of film stretching may not be achieved.

Specifically, the method for preparing the film for a tire inner liner may further include a step of solidifying the base film layer formed through melting and extrusion in a cooling part maintained at a temperature of about 5 to about 40° C., and preferably about 10 to about 30° C. By solidifying the base film layer formed through melting and extrusion in a cooling part while maintaining a temperature of about 5 to about 40° C., a film with a more uniform thickness may be provided. If the base film layer formed through melting and extrusion is folded or attached to a cooling part maintained at an appropriate temperature, orientation may not substantially occur, and the base film layer may be provided as an unstretched film.

Further, by appropriately controlling the horizontal distance between the die outlet and the cooling part, and rapidly attaching the extrudate discharged from the die to the cooling part and solidifying it using an air knife, an air nozzle, an electrostatic charging device (pinning device), or a combination thereof, the base film may not substantially generate orientation due to stretching. Specifically, the preparing method of the tire inner liner film may further include a step of uniformly attaching the extrudate to the cooling part, using at least one device selected from the group consisting of an air knife, an air nozzle, and an electrostatic charging device (pinning device), located at a horizontal distance of about 10 to about 300 mm from the die outlet.

In the step of forming the base film, except for the above-explained steps and conditions, film extrusion conditions commonly used for preparing of a polymer film, for example, screw diameter, screw rotation speed, line speed, and the like may be appropriately selected.

Meanwhile, the ratio of tensile modulus in the second direction to tensile modulus in the first direction at the initial about 2% elongation of the base film layer obtained by the above method may be 0.9 to 1.1, preferably 0.92 to 1.08, the second direction being perpendicular to the first direction. The ratio of yield strength in the second direction to yield strength in the first direction of the manufactured base film layer may be about 0.9 to about 1.1, preferably about 0.92 to about 1.08, the second direction being perpendicular to the first direction. Flat elongation in the first direction and flat elongation in the second direction of the manufactured base film layer may be respectively about 150% or more, preferably about 200% to about 400%, the second direction being perpendicular to the first direction, and the ratio of flat elongation in the second direction to flat elongation in the first direction may be about 0.9 to about 1.1, and preferably about 0.92 to about 1.08.

The details of the polyamide-based resin and the copolymer including the polyamide-based segment and the polyether-based segment are as explained above.

Meanwhile, in the step of forming the base film layer, to extrude a film having a more uniform thickness, the copolymer and the polyamide-based resin may be controlled so as to have a uniform size. By controlling the sizes of the copolymer and the polyamide-based resin, in the step of mixing them, within in a feeder maintained at a constant temperature, or while melting and extruding and the like, the copolymer and the polyamide-based resin may be more uniformly mixed, so agglomeration of the copolymer and the polyamide-based resin to become large may be prevented, and thus, a base film having a more uniform thickness may be formed.

If the copolymer and the polyamide-based resin have similar sizes, agglomeration of raw material chips or generation of non-uniform shapes or areas may be minimized in the subsequent mixing, melting, or extruding step, thereby forming a base film layer having a uniform thickness over the whole area of the film. The sizes of the copolymer and the polyamide-based resin that can be used in the preparing method are not specifically limited.

Meanwhile, in the step of preparing the base film, it may be preferable to maintain an appropriate winding speed of the film to prevent problems of an increase in orientation degree and cooling faults. For example, the winding speed may be maximally inhibited to 100 m/min or less, and preferably 50 m/mine or less.

Meanwhile, in the step of preparing the base film, the thickness of the discharged molten resin sheet may be controlled by the discharge amount of the extruder, die width, or gap, the winding speed of a cooling roll, and the like, or the thickness of the base film may be controlled to 30 to 300 μm by uniformly attaching and cooling it using an air knife, an air nozzle, an electrostatic edge pinning device, and the like.

The method for preparing the film for a tire inner liner may further include mixing the polyamide-based resin and the copolymer in a weight ratio of 6:4 to 3:7. If the content of the polyamide-based resin is too low, the density or gas barrier property of the base film layer may be lowered. If the content of the polyamide-based resin is too high, the modulus of the base film layer may become too high or formability of a tire may be lowered, the polyamide-based resin may be crystallized under a high temperature environment during a tire preparing process or automobile running, and cracks may be generated due to repeated deformations. In the mixing step, equipment or methods known to be usable for mixing a polymer resin may be used without specific limitations.

The polyamide-based resin and the copolymer may be introduced into a feeder after they are mixed, or may be sequentially or simultaneously introduced into a feeder and mixed.

As explained above, the copolymer may include the polyamide-based segment and the polyether-based segment in the weight ratio of about 6:4 to about 3:7.

The preparing method of the film for a tire inner liner may include a step of forming an adhesive layer including a resorcinol-formalin-latex (RFL)-based adhesive on at least one side of the base film layer.

The adhesive layer including the resorcinol-formalin-latex (RFL)-based adhesive may be formed by coating the resorcinol-formalin-latex (RFL)-based adhesive on one side of the base film layer, or by laminating an adhesive film including the resorcinol-formalin-latex (RFL)-based adhesive on one side of the base film layer.

Preferably, the step of forming the adhesive layer may be progressed by coating the resorcinol-formalin-latex (RFL)-based adhesive on one side or both sides of the base film, and then drying. The formed adhesive layer may have a thickness of about 0.1 to about 20 μm, and preferably about 0.1 to about 10 μm. The resorcinol-formalin-latex (RFL)-based adhesive may include about 2 to about 32 wt % of a condensate of resorcinol and formaldehyde, and about 68 to about 98 wt %, preferably about 80 to about 90 wt %, of latex.

The details of the resorcinol-formalin-latex (RFL)-based adhesive with the above specific composition are as explained above.

Commonly used coating method or apparatuses may be used to coat the adhesive without specific limitations, but knife coating, bar coating, gravure coating or spraying, or immersion may be used. However, knife coating, gravure coating, or bar coating may be preferable for uniform coating of the adhesive.

After forming the adhesive layer on one side or both sides of the base film, drying and adhesive reactions may be simultaneously progressed, but heat treatment may be progressed after drying considering reactivity of the adhesive, and the formation of the adhesive layer and drying and heat treatment may be applied several times for the thickness of the adhesive layer or application of multi-layered adhesive. After coating the adhesive on the base film, heat treatment may be conducted by solidifying and reacting at about 100 to about 150° C. for approximately 30 seconds to 3 minutes.

As explained, since the elongation property of the base film does not significantly change even if the adhesion layer is formed on the base film layer, the film for a tire inner liner may have an elongation property that is identical to that of the base film. For example, the ratio of tensile modulus in the second direction to tensile modulus in the first direction at the initial about 2% elongation of the tire inner liner film may be about 0.9 to about 1.1, preferably about 0.92 to about 1.08, and the ratio of yield strength in the second direction to yield strength in the first direction of the tire inner liner film may be 0.9 to 1.1, and preferably 0.92 to 1.08, the second direction being perpendicular to the first direction.

Further, flat elongation in the first direction and flat elongation in the second direction of the tire inner liner film may be respectively 150% or more, and preferably 200% to 400%, the second direction being perpendicular to the first direction. The of flat elongation in the second direction to flat elongation in the first direction of the tire inner liner film may be 0.9 to 1.1, and preferably 0.92 to 1.08.

In the step of forming the copolymer or mixture, or in the step of melting and extruding the copolymer, additives such as a heat resistant oxidant or a heat stabilizer and the like may be additionally added. The details of the additives are as explained above.

The method for preparing a film for a tire inner liner may further include a step of forming a release film layer including a polymer film having an initial modulus of 1500 Mpa or more at room temperature on the adhesive layer.

The release film layer may be formed on the adhesive layer by a commonly known lamination method of a polymer film or application or coating of a polymer resin and the like. In the winding step after coating the adhesive on the base film, the release film layer may be laminated on the adhesive layer by winding the release film layer together.

Specifically, the step of forming the release film layer may include coating at least one polymer selected form the group consisting of a polyolefin-based resin and polyester resin on the adhesive layer to form a release film layer with a thickness of 5 um to 50 um; or laminating a film including a polymer selected form the group consisting of a polyolefin-based resin and a polyester resin on the adhesive layer to form a release film layer with a thickness of 5 um to 50 um.

As explained, the release film layer may have an initial modulus of 1500 Mpa or more, and preferably 2000 Mpa or more. The polymer film included in the release film layer may include a polyolefin-based resin, a polyester resin, or a mixture or copolymer thereof. The release film layer may have a thickness of about 5 to about 50 um, and preferably about 8 to about 35 um.

Hereinafter, examplary examples are presented, but these examples are only to illustrate the invention and the scope of the invention is not limited thereto.

EXAMPLES

Manufacture of a Film for a Tire Inner Liner

Example 1

(1) Manufacture of a Base Film 40 wt % of a polyamide-based resin (nylon 6) with relative viscosity (96% sulfuric acid solution) of 3.4 and 60 wt % of a copolymer resin having a weight average molecular weight of 100,000 (including 50 wt % of polyamide-based repeating unit and 50 wt % of polyether-based repeating unit) were mixed, and the mixture was melt-extruded at 260° C. with a T-type die under a 0.6 mm die gap condition. The obtained molten film was fixed to a cooling roll (maintained at 15° C., rotation speed: 15 m/min) within a horizontal distance of 30 mm from the die outlet, cooled, and solidified, and a discharge amount of the extruder was controlled with G/P to obtain an unstretched base film with a thickness of 70 μm. In The thickness of the base film was measured using a gauge tester.

In the step of folding the molten film to a cooling roll, an air knife was positioned at a horizontal distance at 30 mm from the folding site, and edge pinning was installed within 5 mm from both ends of folding line of the folded sheet so that the molten film may be attached to a cooling roll with air pressure and static electricity.

(2) Coating of Adhesive

Resorcinol and formaldehyde were mixed at a mole ratio of 1:2, and then condensation was conducted to obtain a condensate of resorcinol and formaldehyde. 12 wt % of the condensate of resorcinol and formaldehyde and 88 wt % of styrene/1,3-a butadiene/vinylpyridine latex were mixed to obtain a mixture of resorcinol/formaldehyde-latex with a concentration of 20%.

The resorcinol-formalin-latex (RFL)-based adhesive was coated on the base film with a thickness of 1 um using a gravure coater, and dried and reacted at 150° C. for 1 minute to form an adhesive layer.

Example 2

A film for a tire inner liner was manufactured by the same method as Example 1, except that an unstretched film with a thickness of 100 um was manufactured at a resin extrusion temperature of 270° C. with die gap of 0.8 mm using a cooling roll rotating at 10 m/min.

Example 3

A film for a tire inner liner was manufactured by the same method as Example 1, except that an unstretched film with a thickness of 120 um was manufactured at a resin extrusion temperature of 280° C. with a die gap of 1.0 mm using a cooling roll rotating at 8 m/min.

Example 4

A polyethylene terephthalate stretched film having initial modulus of 4200 Mpa and thickness of 12 μm was manufactured in the form of roll. In the winding step after coating an adhesive on the base film of Example 1, the polyethylene terephthalate stretched film was wound together to laminate a release film on the adhesive layer.

COMPARATIVE EXAMPLES

Manufacture of Film for Tire Inner Liner

Comparative Example 1

A releasing agent and a finishing agent were introduced into butyl rubber and mixed and then refined to obtain a tire inner liner film with a thickness of 70 μm, and an adhesion rubber (tie gum) with a thickness of 1 μm was formed on the inner liner film.

Comparative Example 2

(1) Manufacture of a Base Film

A base film was manufactured by the same method as Example 1, except that 90 wt % of a polyamide-based resin (nylon 6) with relative viscosity (96% sulfuric acid solution) of 3.4 and 10 wt % of a copolymer resin having a weight average molecular weight of 100,000 (including 50 wt % of a polyamide-based repeating unit and 50 wt % of a polyether-based repeating unit) were mixed.

(2) Coating of Adhesive

A resorcinol-formalin-latex (RFL)-based adhesive was prepared by the same method as Example 1, and was coated on the base film and dried to form an adhesive layer with a thickness of 1 um.

Comparative Example 3

(1) Manufacture of a Base Film

A base film was manufactured by the same method as Example 1, except that 20 wt % of a polyamide-based resin (nylon 6) with relative viscosity (96% sulfuric acid solution) of 3.4 and 80 wt % of a copolymer resin having a weight average molecular weight of 100,000 (including 20 wt % of a polyamide-based repeating unit and 80 wt % of a polyether-based repeating unit) were mixed.

(2) Coating of Adhesive

A resorcinol-formalin-latex (RFL)-based adhesive was prepared by the same method as Example 1, and it was coated on the base film and dried to form an adhesive layer with a thickness of 1 um.

Comparative Example 4

(1) Manufacture of a Base Film 40 wt % of polyamide-based resin (nylon 6) with relative viscosity (96% sulfuric acid solution) of 3.4 and 60 wt % of a copolymer resin having a weight average molecular weight of 100,000 (including 50 wt % of a polyamide-based repeating unit and 50 wt % of a polyether-based repeating unit) were mixed, and the mixture was melt-extruded at 260° C. with a T-type die under a 2.0 mm die gap condition. The obtained molten film was fixed to a cooling roll (maintained at 15° C., rotation speed: 15 m/min) within a horizontal distance of 30 mm from the die outlet, cooled, and solidified to obtain an unstretched base film with a thickness of 70 μm. The thickness of the base film was measured using a gauge tester.

In the step of folding the molten film to a cooling roll, an air knife was positioned at a horizontal distance of 30 mm from the folding site, and edge pinning was installed within 5 mm from both ends of the folding line of the folded sheet so that the molten film may be attached to a cooling roll with air pressure and static electricity.

(2) Coating of Adhesive

An adhesive layer was formed by the same method as Example 1, except for using the above-obtained base film.

EXPERIMENTAL EXAMPLES

Measurement of Properties of a Film for a Tire Inner Liner

Experimental Example 1

Measurement of Modulus, Yield Strength, and Flat elongation of Base Film

Modulus, yield strength, and flat elongation were measured in MD (machine direction) and TD (transverse direction) of the tire inner liner films obtained in the examples and comparative examples. The specific measurement method is as follows.

(1) Measurement apparatus: universal testing machine (Model 4204, Instron Company).

(2) Measurement conditions: 1) Head Speed 300 mm/min, 2) Grip Distance 100 mm, 3) Sample Width 10 mm, 4) Measured under a 25° C. and 60 RH % atmosphere.

(3) Each was measured 5 times, and the average of the obtained results was calculated.

In the stress-strain curve obtained from the above measured data, 1) the "gradient value of the stress-strain graph" at the initial 2% elongation was determined as modulus, 2) the "maximum value of the stress appeared in 0 to 50% elongation section of the stress-strain graph" was determined as yield strength, and 3) in the elongation section beyond the yield point of the stress/strain graph, the elongation percentage at a point where stress becomes identical to the yield strength generating point (or elongation percentage at a point where the gradient change of S-S curve is the largest in the elongation section beyond yield point) was determined as flat elongation.

Experimental Example 2

Measurement of Oxygen Permeability

Oxygen permeability of the tire inner liner films obtained in the examples and comparative examples were measured. the specific measurement method is as follows.

(1) Oxygen permeability: measured under a 25° C. and 60 RH % atmosphere using an Oxygen Permeation Analyzer, Model 8000, (Illinois Instruments Inc.) according to ASTM D 3895.

Experimental Example 3

Measurement of Internal Pressure Retention

Tires were manufactured using the tire inner liner films of the examples and comparative examples applying the 205R/65R16 standard. Further, 90-day IPRs (internal pressure retention) of the manufactured tires were measured and compared at 21° C. under a pressure of 101.3 kPa according to ASTM F1112-06.

The results of Experimental Examples 1 to 3 are shown in the following Table 1, and the graph of stress generated when the base films of the examples and comparative examples were strained in the MD (machine direction) is shown in FIG. 1.

TABLE 1

| Results of Experimental Examples 1 to 3 | | | | | | | |
|---|---|---|---|---|---|---|---|
| | Example 1 | Example 2 | Example 3 | Comparative Example 1 | Comparative Example 2 | Comparative Example 3 | Comparative Example 4 |
| Modulus MD/TD (MPa) | 408/398 | 418/405 | 467/432 | 73/71 | 1620/1450 | 168/151 | 721/615 |
| Modulus relative ratio (MD/TD) | 1.02 | 1.03 | 1.08 | 1.02 | 1.11 | 1.11 | 1.17 |
| Yield strength MD/TD (MPa) | 14/13 | 15/14.5 | 17/16.5 | 3.1/3.0 | 46/38 | 8/7 | 21/17 |
| Yield strength relative ratio (MD/TD) | 1.08 | 1.03 | 1.03 | 1.03 | 1.21 | 1.14 | 1.23 |
| Flat elongation MD/TD (%) | 215/225 | 210/220 | 200/215 | — | — | 250/270 | 125/130 |

TABLE 1-continued

Results of Experimental Examples 1 to 3

| | Example 1 | Example 2 | Example 3 | Comparative Example 1 | Comparative Example 2 | Comparative Example 3 | Comparative Example 4 |
|---|---|---|---|---|---|---|---|
| Flat elongation relative ratio (MD/TD) | 0.95 | 0.95 | 0.93 | — | 0.91 | 0.92 | 0.96 |
| Oxygen permeability (cc/m² day atm) | 65 | 50 | 42 | 650 | 30 | 230 | 63 |
| Internal pressure retention (%) | 96 | 97 | 98 | 75 | — | 85 | — |
| Internal pressure retention/ formability observation | Good | Good | Good | Internal pressure faulty | Forming faulty | Internal pressure faulty | Forming faulty |

As shown in the Table 1, the tire inner liner films of the examples may exhibit oxygen permeability of 200 cc/m²*24 h*atm or less, thus achieving an excellent gas barrier property with a thin thickness, and may be easily elongated or deformed with a low force in a tire preparing process, thus affording excellent formability of a green tire or final tire.

Further, it was confirmed that the base films obtained in the examples have uniform properties in all directions of the film, and particularly have little property difference between the MD (machine direction) and TD (transverse direction) of the film. Specifically, it was confirmed that when the base film was elongated, the ratio of MD tensile modulus and TD tensile modulus, the ratio of MD yield strength and TD yield strength, and the ratio of MD flat elongation and TD flat elongation are within the range of 0.9 to 1.1. It was also confirmed that the MD flat elongation and the TD flat elongation of the tire inner liner film are respectively 150% or more.

Also, as shown in FIG. 1, it was confirmed that the tire inner liner films of Examples 1 to 3 have flat elongation of 150% or more and relatively small initial gradient in the Strain-Stress graph, thus exhibiting a low modulus property and excellent formability.

To the contrary, the tire inner liner film of Comparative Example 4 has a small flat elongation section of less than 150%, a large initial gradient of the graph, and a relatively high yield point, and thus formability of a tire or other properties are insufficient to be applied for a practical tire. The tire inner liner film of Comparative Example 2 has too high a yield point and does not have a flat elongation section, and thus forming is not easy in a general tire preparing process. The tire inner liner films of Comparative Examples 1 and 3 have good modulus and flat elongation, but insufficient air barrier property, and thus are not suitable to be applied for a practical tire.

Experimental Example 4

Measurement of Formability

A tire was manufactured using the tire inner liner film of Example 4 applying the 205R/65R16 standard. During the tire preparing process, manufacturability and appearance were evaluated after preparing a green tire, and then the final appearance of the tire was examined after vulcanization.

Consequently, the tire inner liner film of Example 4 has optimum modulus property and yield strength, thus exhibiting optimum formability in a tire preparing process, and by including a release film, prevents product damage or blocking during storage for a long period and increases operability during a tire preparing process.

Specifically, in case the tire inner liner of Example 4 is used, deformation of a film caused by fusion of an adhesive liquid on both sides may be prevented while unfolding of the film from the roll for manufacture of a tire, and insufficient adhesion to rubber due to sticking of adhesive to one side in the unfolded film from the roll may be prevented.

What is claimed is:

1. A film for a tire inner liner comprising:
a base film layer comprising a polyamide-based resin and a copolymer comprising a polyamide-based segment and a polyether-based segment; and
an adhesive layer formed on at least one side of the base film layer and comprising a resorcinol-formalin-latex (RFL)-based adhesive, and
the ratio of tensile modulus in a second direction to tensile modulus in a first direction at initial 2% elongation of the base film layer is 0.9 to 1.1, the second direction being perpendicular to the first direction.

2. The film for a tire inner liner according to claim 1, wherein a ratio of yield strength in the second direction to yield strength in the first direction of the base film is 0.9 to 1.1, the second direction being perpendicular to the first direction.

3. The film for a tire inner liner according to claim 1, wherein flat elongation in the first direction and flat elongation in the second direction of the base film layer are respectively 150% or more, the second direction being perpendicular to the first direction, and
a ratio of flat elongation in the second direction to flat elongation in the first direction is 0.9 to 1.1.

4. The film for a tire inner liner according to claim 1, wherein the first direction is the same as a TD (transverse direction) of the base film, and the second direction is the same as an MD (machine direction) of the base film.

5. The film for a tire inner liner according to claim 1, wherein the polyamide-based segment of the copolymer comprises a repeating unit of the following Chemical Formula 1 or Chemical Formula 2:

[Chemical Formula 1]

in Chemical Formula 1, $R_1$ is a C1-20 liner or branched alkylene group or a C7-20 liner or branched arylalkylene group,

[Chemical Formula 2]

in Chemical Formula 2, $R_2$ is a C1-20 linear or branched alkylene group, and $R_3$ is a C1-20 linear or branched alkylene group or a C7-20 liner or branched arylalkylene group.

6. The film for a tire inner liner according to claim 1, wherein the polyether-based segment of the copolymer comprises a repeating unit of the following Chemical Formula 3:

[Chemical Formula 3]

in Chemical Formula 3, $R_5$ is a C1-10 linear or branched alkylene group, and n is an integer of from 1 to 100, and $R_6$ and $R_7$ may be identical or different, and are independently a direct bond, —O—, —NH—, —COO—, or —CONH—.

7. The film for a tire inner liner according to claim 1, wherein the base film layer has a thickness of 30 to 300 μm, and the adhesive layer has a thickness of 0.1 to 20 μm.

8. The film for a tire inner liner according to claim 1, wherein the base film layer is an unstretched film.

9. The film for a tire inner liner according to claim 1, further comprising a release film layer formed on the adhesive layer, and comprising a polymer film having an initial modulus of 1500 Mpa or more at room temperature.

10. A method for preparing a film for a tire inner liner, comprising melting a mixture of a polyamide-based resin and a copolymer comprising a polyamide-based segment and a polyether-based segment at 230 to 300° C.;

extruding the molten substance under a die gap condition of 0.3 to 1.5 mm to form a base film layer; and forming an adhesive layer comprising a resorcinol-formalin-latex (RFL)-based adhesive on at least one side of the base film layer, and a ratio of tensile modulus in an MD (machine direction) to tensile modulus in a TD (transverse direction) at initial 2% elongation of the base film layer is 0.9 to 1.1.

11. The method according to claim 10, wherein the step of forming the base film layer further comprises attaching the extrudate to a cooling part located at a horizontal distance of 10 to 150 mm from a die outlet.

12. The method according to claim 11, further comprising the step of uniformly attaching the extrudate to the cooling part, and using at least one device selected from the group consisting of an air knife, an air nozzle, and a electrostatic charging device located at a horizontal distance of 10 to 300 mm from the die outlet.

13. The method according to claim 10, wherein a ratio of yield strength in a TD (transverse direction) and yield strength in an MD (machine direction) of the base film layer is 0.9 to 1.1.

14. The method according to claim 10, wherein flat elongation in a TD (transverse direction) and flat elongation in an MD (machine direction) of the base film layer are respectively 150% or more, and a ratio of flat elongation in the MD (machine direction) to flat elongation in the TD (transverse direction) is 0.9 to 1.1.

15. The method according to claim 10, further comprising the step of forming a release film layer comprising a polymer film having an initial modulus of 1500 Mpa at room temperature on the adhesive layer.

* * * * *